(12) United States Patent
Gantner et al.

(10) Patent No.: US 8,183,985 B2
(45) Date of Patent: May 22, 2012

(54) METHOD AND DEVICE FOR THE POWER-SAVING OPERATION OF RFID DATA CARRIERS

(75) Inventors: Reinhold Gantner, Bludenz (AT); Karl-Heinz Feierle, Dornbirn (AT)

(73) Assignee: Identec Solutions AG, Lustenau (AT)

( * ) Notice: Subject to any disclaimer, the term of this patent is extended or adjusted under 35 U.S.C. 154(b) by 854 days.

(21) Appl. No.: 12/179,474

(22) Filed: Jul. 24, 2008

(65) Prior Publication Data
US 2009/0027172 A1  Jan. 29, 2009

(30) Foreign Application Priority Data

Jul. 25, 2007 (DE) .......................... 10 2007 034 592

(51) Int. Cl.
*H04Q 5/22* (2006.01)
*G08B 5/22* (2006.01)
*G08C 17/00* (2006.01)
(52) U.S. Cl. ................. 340/10.33; 340/10.34; 340/7.38; 370/311
(58) Field of Classification Search ...... 340/10.3–10.44, 340/7.38, 7.33, 7.34; 455/343.1–343.4; 370/311, 370/314
See application file for complete search history.

(56) References Cited

U.S. PATENT DOCUMENTS

| | | | | |
|---|---|---|---|---|
| 5,686,902 A * | 11/1997 | Reis et al. | ..................... | 340/10.2 |
| 6,329,944 B1 * | 12/2001 | Richardson et al. | ............ | 342/42 |
| 6,963,270 B1 * | 11/2005 | Gallagher et al. | ........... | 340/10.2 |
| 7,170,867 B2 * | 1/2007 | O'Toole et al. | ................ | 370/311 |
| 2005/0237161 A1 * | 10/2005 | Lee et al. | .................... | 340/10.33 |
| 2006/0205421 A1 * | 9/2006 | Record | ......................... | 455/502 |

FOREIGN PATENT DOCUMENTS

| | | |
|---|---|---|
| DE | 19627736 A1 | 1/1998 |
| DE | 10044035 A1 | 3/2002 |
| DE | 10330451 B3 | 9/2004 |
| DE | 102005057972 A1 | 6/2007 |

OTHER PUBLICATIONS

Search Report from the German Patent and Trademark Office, 4 pages (Mar. 26, 2008).

* cited by examiner

*Primary Examiner* — Benjamin C Lee
*Assistant Examiner* — Omeed Alizada
(74) *Attorney, Agent, or Firm* — The Maxham Firm

(57) ABSTRACT

A method and a device for power-saving operation of RFID data carriers, whereby the RFID data carrier has a transmission and reception antenna, by way of which data are sent to or received from a transmission/read unit, by means of a radio signal, within a transmission field, whereby the data carrier is configured for a power-saving sleep mode, and switches over to the reception mode by means of a wake-up signal. With the transmission of the wake-up signal, at the same time, a time datum is transmitted to the data carrier, whereby the time datum shows the time that indicates how much time must still elapse until transmission of a command. The data carrier configured with the sleep mode switches over to a reception mode by means of a wake-up signal, whereby the wake-up signal additionally has a time datum that forms a countdown time, and switches the data carrier into the reception mode briefly, after this time has elapsed, thereby causing the data carrier to receive a command.

5 Claims, 2 Drawing Sheets

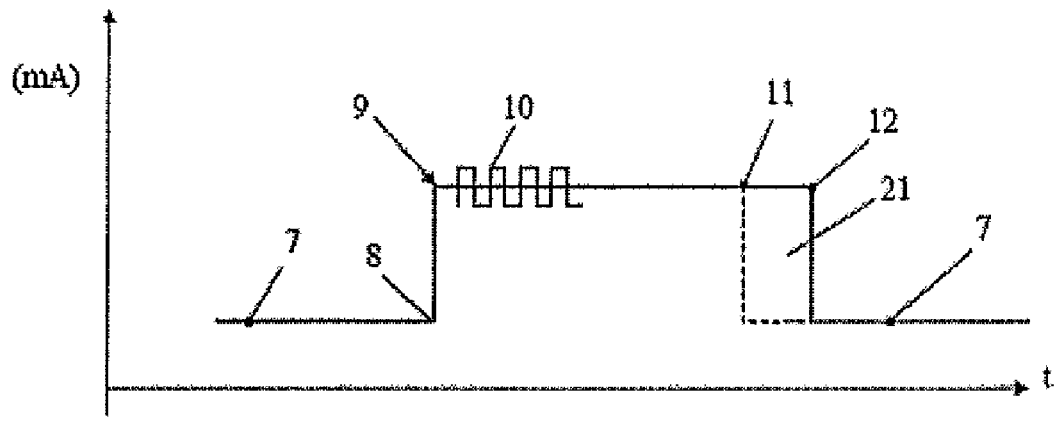
Fig. 2
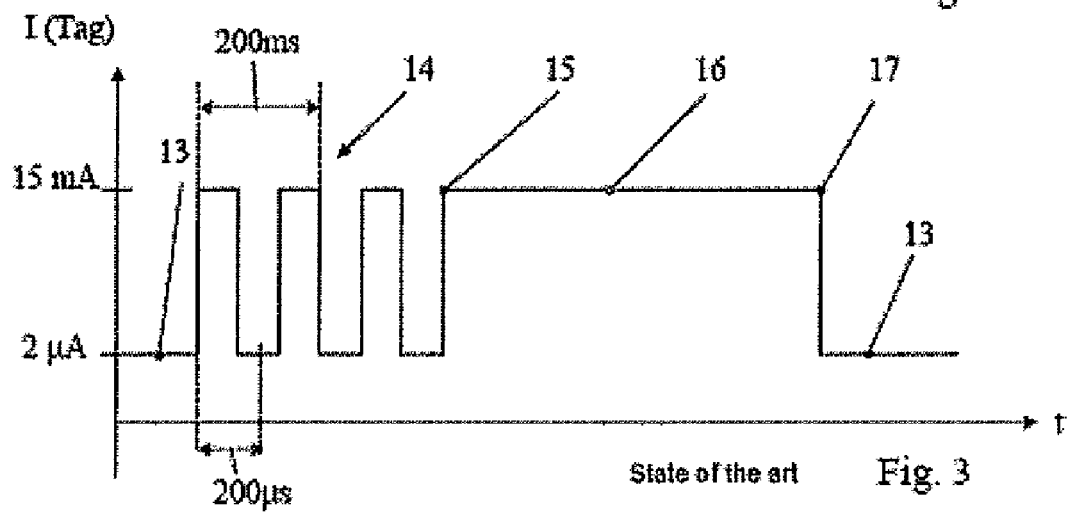
State of the art    Fig. 3
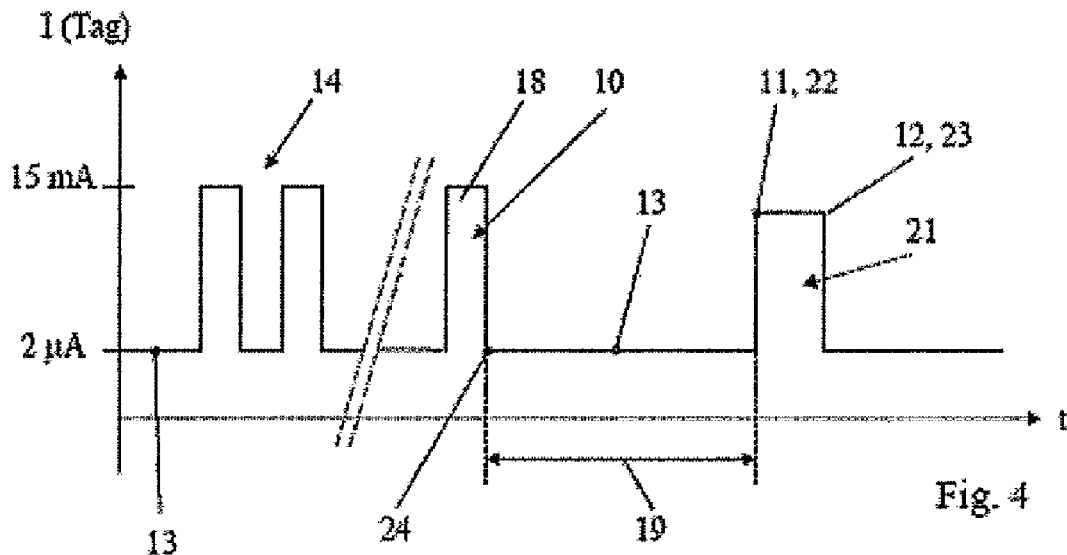
Fig. 4

METHOD AND DEVICE FOR THE POWER-SAVING OPERATION OF RFID DATA CARRIERS

FIELD OF THE INVENTION

The invention relates to a method and a device for power-saving operation of RFID data carriers.

BACKGROUND OF THE INVENTION

Power-saving operation of data carriers has become known, for example, with the object of German patent 103 30 451 B3, in which a wake-up command is sent from a control device to a data carrier, so that the latter goes into an awake state and is ready to receive corresponding signals from the control device. With this, there is the advantage that the data carrier consumes relatively high current only when it has in fact received the wake-up command.

However, a disadvantage of this known arrangement is that the wake-up command always puts the data carrier into an awake state immediately, and thus makes it ready to receive the corresponding signals of the control device. In this connection, it is presumed, in the state of the art, that the length of the wake-up signal is longer than the so-called "sniff period." "Sniff period" is understood to mean pulse-wise wake-up, and a pulse-wise reception mode of the RFID data carrier.

In accordance with this requirement, it is necessary that the length of the wake-up signal is longer than a sniff period. In this way, it is ensured that one wake-up signal, in each instance, can be received during the pulse-wise reception operation.

The fact that after expiration of the wake-up signal, the command itself is also transmitted at the end of the wake-up signal, is also part of the state of the art. During this time, in the state of the art, the data carrier has to be in reception readiness mode, and this consumes unnecessary power. In other words, it must remain in the awake state during the entire wake-up command and even afterward, during transmission of the actual command, and this unnecessarily uses battery power.

SUMMARY OF THE INVENTION

The invention is, therefore, based on the task of further developing a method and a device for power-saving operation of an RFID data carrier in such a manner that the power consumption can be significantly reduced.

To accomplish this task, the method is characterized in that with the transmission of the wake-up signal, at the same time, a time datum is transmitted to the data carrier, whereby the time datum shows the time that indicates how much time must still elapse until transmission of a command. In other words, this is a countdown time, which means that the data carrier now knows that it does not have to wake up immediately after receiving the wake-up signal, but rather knows that the actual command to be evaluated will come 2 to 200 ms later, for example.

In this method, an awake state is specifically not maintained during the entire wake-up command, but rather, the wake-up command comprises a time datum, so that the data carrier now determines, on the basis of evaluating this time datum, when it actually must go into reception mode. The time from arrival of the wake-up command with the transmission of the time datum to reception of the actual command can be spent in power-save mode, and this saves significant battery power.

This is a significant advantage as compared with the state of the art, because in the prior art, the data carrier was in a power-consuming reception state during the entire wake-up command, and this is avoided by the present invention. A power factor in power savings in the range of 50 to 200 of normal power consumption of a prior art data carrier is achieved by this invention.

BRIEF DESCRIPTION OF THE DRAWING

Embodiments of the invention will be explained in greater detail using the attached drawing figures that represent merely one method of implementation, wherein:

FIG. 2 is a current diagram of the transmission/read unit shown in FIG. 1;

FIG. 3 is a current diagram of a data carrier according to the state of the art; and FIG. 4 is a current diagram of a data carrier according to the invention.

DETAILED DESCRIPTION OF THE PREFERRED EMBODIMENTS

Figure 1:
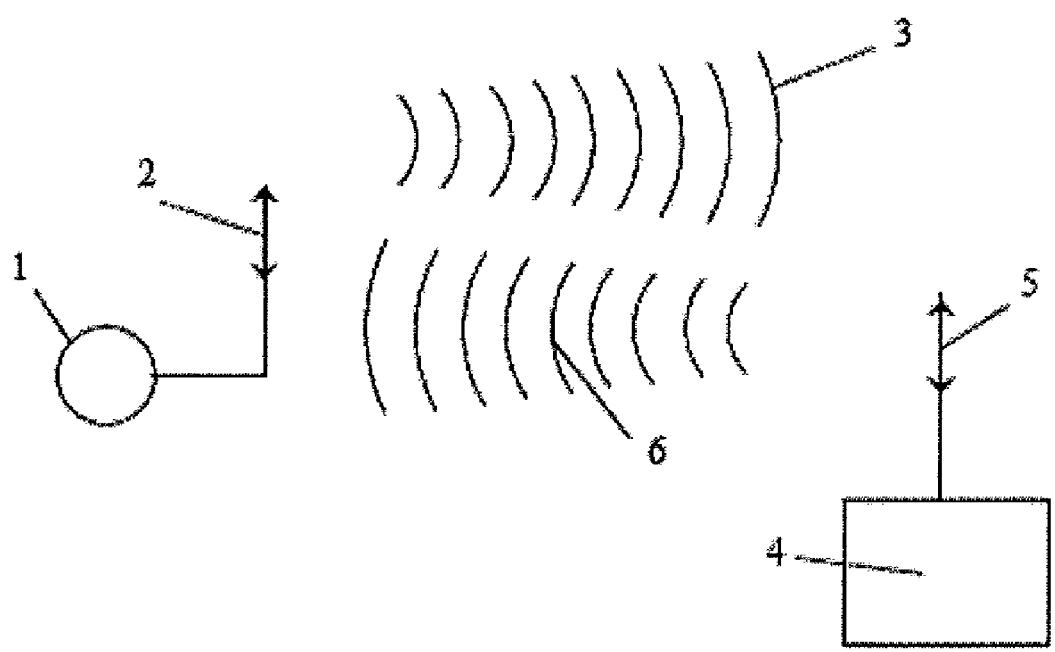
FIG. 1 shows a schematic arrangement of a transmission/read unit with a data carrier in accordance with the invention.

FIG. 1 shows, in general, that a transmission/read unit 1 is equipped with transmission/reception antenna 2 and transmits a corresponding transmission field 3 to at least one data carrier 4, which in turn is equipped with transmission/reception antenna 5. This antenna therefore transmits a transmission field 6, which in turn is received and evaluated by transmission/reception antenna 2 of transmission/read unit 1.

Of course, it is possible that instead of the arrangement in FIG. 1, the transmission/read unit applies signals to a plurality of data carriers 4, which accordingly also respond with a plurality of transmission fields 6. For the sake of simplicity, however, only the communication between a transmission/read unit and a single data carrier 4 will be explained in greater detail.

In FIG. 2, it is evident that the current diagram of transmission/read unit 1 consists of the pattern that first, proceeding from a rest mode 7, a wake-up signal 9 is transmitted by way of transmission field 3 (FIG. 1) at position 8. This wake-up signal would be maintained for a relatively long period of time, up to the position 11, until the actual command 21 is transmitted to data carrier 4 in the interstice between position 11 and position 12. After transmission of the command 21, the transmission/read unit is brought back into the rest mode 7 at position 12.

FIG. 3 shows how a data carrier 4 structured according to the state of the art reacts to the current signals from transmission/read unit 1. First of all, proceeding from a sleep mode 13, a so-called sniff mode is carried out. This means that in the range of a time period of about 200 µs, a switch to reception mode level 14 takes place for a short time, and the period duration of such short-term switches to the reception amounts to about 200 ms.

It is important that the sniff mode is continued so that the wake-up signal 9 can be received at least starting from position 8 (FIG. 2). As soon as this wake-up signal 9 was received at least once in the region of reception mode 14, the power consumption of a data carrier according to the state of the art goes up greatly, and remains in a permanent reception mode 16, which uses a very great amount of power, between position 15 and position 17.

Only before the position 17 is reached is the actual command 21 received, and after reception of this command, the power consumption of the data carrier according to the state of the art goes back to sleep mode 13.

This is where the present invention takes its start. In principle, it carries out the same short-term reception mode 14, according to FIG. 4, with a data carrier 4, only that according to the invention, a time datum 10 is transmitted with the wake-up signal 9. The content of this time datum 10 is a so-called countdown time, which means that data carrier 4 is being informed that the actual command 21 will only be transmitted after expiration of the countdown time 19. This means that from position 24 to position 22, the data carrier can still remain in the sleep mode 13, because it knows precisely when it has to wake up. This was not the case in the state of the art, because there, a permanent reception mode 16 was in effect.

In other words, during the countdown time 19, the duration of which is reported with the time datum 10, a switch to sleep mode 13 takes place, or this mode is maintained, so that a switch to the power-consuming reception mode 14 takes effect only after expiration of countdown time 19, at position 22, and the actual command 21 is only received during this short reception time, up to position 23.

Here, it is therefore a significant advantage that during countdown time 19, power-saving operation is provided, which was not the case in the prior art.

It is important that a reception mode 14 must be in the region of the wake-up signal 9 at least once, namely after position 18, so that the presence of the wake-up signal 9 is recognized by the data carrier 4 at all.

In the case of the present invention, significant power savings are therefore achieved, which did not exist in the known prior art.

What is claimed is:

1. A method for power-saving operation of an RFID data carrier, whereby the RFID data carrier has a transmission/reception antenna, by way of which data are sent to and received from a transmission/road unit, respectively, by means of a radio signal within a transmission field, the method comprising:
   configuring the data carrier for a power-saving sleep mode, the data carrier responding to a wake-up signal to switch to a reception mode;
   transmitting a wake-up signal to the data carrier, while at the same time;
   transmitting a time datum to said data carrier, whereby the time datum shows the time that indicates how much time must still elapse until transmission of a command;
   wherein the data carrier wakes up at a later point in time of about 2 to 200 ins after reception of the time datum when the actual command to be evaluated comes, as indicated by the time shown in the time datum;
   wherein the data carrier, proceeding from a sleep mode, performs a sniff mode, whereby the sniff mode momentarily switches the data carrier into the reception mode with a delay of about 200 µs, whereby the momentary switch to the reception mode is periodic and lasts until the wake-up signal is received once by the data carrier; and
   wherein after transmission of the time datum, the data carrier remains in the sleep mode in accordance with the time datum, and then briefly switches over into the reception mode in order to be in the reception mode, and the command is transmitted.

2. The method according to claim 1, wherein the data carrier wakes up at a later point in time of about 2 to 200 ms after reception of the time datum when the actual command to be evaluated comes, whereby the time datum is configured as a countdown time.

3. The method according to claim 1, wherein from a rest mode, the transmission/read unit transmits a wake-up signal to the data carrier by way of a transmission field, maintaining the wake-up signal for a relatively long period of time, until the data carrier receives the command.

4. The method according to claim 1, wherein after transmission of the time datum, the data carrier remains in the sleep mode in accordance with the time datum, which is configured as a countdown time, and after expiration of the countdown time, the data carrier briefly switches over into the reception mode, and the command is transmitted.

5. The method according to claim 4, wherein the countdown time demonstrates a relatively low power consumption in comparison with the reception mode.

* * * * *